US012671626B2

(12) United States Patent (10) Patent No.: US 12,671,626 B2
Parsons et al. (45) Date of Patent: Jun. 30, 2026

(54) SCALABLE CONTROL OF NETWORK ELEMENTS

(71) Applicant: MICROSOFT TECHNOLOGY LICENSING, LLC, Redmond, WA (US)

(72) Inventors: James Duncan Parsons, Hatfield (GB); George Arthur Blackburn, London (GB); Thomas Flynn, Cambridge (GB); Charles Richard Stedman, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 29 days.

(21) Appl. No.: 18/788,038

(22) Filed: Jul. 29, 2024

(65) Prior Publication Data

US 2026/0032048 A1     Jan. 29, 2026

(51) Int. Cl.
H04L 41/082      (2022.01)
H04L 41/0663     (2022.01)
H04L 41/0866     (2022.01)

(52) U.S. Cl.
CPC ........ H04L 41/082 (2013.01); H04L 41/0663 (2013.01); H04L 41/0866 (2013.01)

(58) Field of Classification Search
CPC .......................... H04L 41/082; H04L 41/0663; H04L 41/0866
See application file for complete search history.

(56) References Cited

U.S. PATENT DOCUMENTS

| | | | |
|---|---|---|---|
| 11,409,632 B1 * | 8/2022 | Cao ..................... | G06F 11/3612 |
| 11,838,176 B1 * | 12/2023 | Vanjare ................ | H04L 41/082 |
| 2017/0075721 A1 * | 3/2017 | Bishop ................. | G06F 9/4881 |
| 2019/0052549 A1 * | 2/2019 | Duggal ............... | H04L 41/5045 |
| 2022/0337479 A1 * | 10/2022 | Zheng ................. | H04L 41/0806 |
| 2023/0412608 A1 * | 12/2023 | Vaishnavi ............. | H04L 63/102 |
| 2024/0031226 A1 * | 1/2024 | Loudon ................. | H04L 41/082 |
| 2024/0073109 A1 * | 2/2024 | Vaishnavi ........... | H04L 41/5058 |
| 2024/0089296 A1 * | 3/2024 | Murphy .............. | H04L 41/0806 |
| 2024/0095100 A1 * | 3/2024 | Pateromichelakis ... | G06F 9/541 |
| 2025/0164970 A1 * | 5/2025 | Linsbauer ........ | G05B 19/41815 |
| 2025/0193904 A1 * | 6/2025 | Chen ................. | H04W 72/0446 |

OTHER PUBLICATIONS

"Management Information Base", Retrieved from: https://en.wikipedia.org/wiki/Management_information_base, Retrieved on: Jun. 26, 2025, 6 Pages.

* cited by examiner

*Primary Examiner* — Richard G Keehn
(74) *Attorney, Agent, or Firm* — Han Gim; Newport IP, LLC

(57) ABSTRACT
A network element has a replication process between a first instance and a second instance of the network element, such that the second instance is able to take over functioning of the network element in the event of failure of the first instance. The first instance receives a desired configuration to be applied to the network element. The second instance also receives the desired configuration. The second instance drops the desired configuration it received. The desired configuration is mapped from a declarative form to an imperative form at the first instance and the imperative form of the desired configuration is executed at the first instance such that the desired configuration is applied at the network element.

20 Claims, 6 Drawing Sheets

SCALABLE CONTROL OF NETWORK ELEMENTS

BACKGROUND

Communications network elements such as session border controllers, firewalls, routers, switches and other network nodes often need to be controlled by a communications network infrastructure provider or network operator. Changes are made for many different reasons such as maintenance, upgrade, configuration of services, trouble shooting and other reasons. In some communications networks, manual login to an individual network element using a command line interface (CLI) may be undergone in order to enable changes to be configured at the network element. Manual login is time consuming and complex. With the manual configuration changes it is difficult to coordinate changes over a plurality of network elements and achieve scalability.

The embodiments described below are not limited to implementations which solve any or all of the disadvantages of known ways of controlling communications network elements.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Scalable control of a communications network element is facilitated by sending a desired configuration to the network element in declarative form, such as from an orchestrator. The network element maps the declarative form of the configuration to an imperative form such that it can be implemented at the network element in an efficient, error free manner (even where the network element is implemented using a highly available pair of instances of the network element or using pools of network elements).

A network element has a replication process between a first instance and a second instance of the network element, such that the second instance is able to take over functioning of the network element in the event of failure of the first instance. The first instance receives a desired configuration to be applied to the network element. The second instance also receives the desired configuration. The second instance drops the desired configuration it received. The desired configuration is mapped from a declarative form to an imperative form at the first instance and the imperative form of the desired configuration is executed at the first instance such that the desired configuration is applied at the network element.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
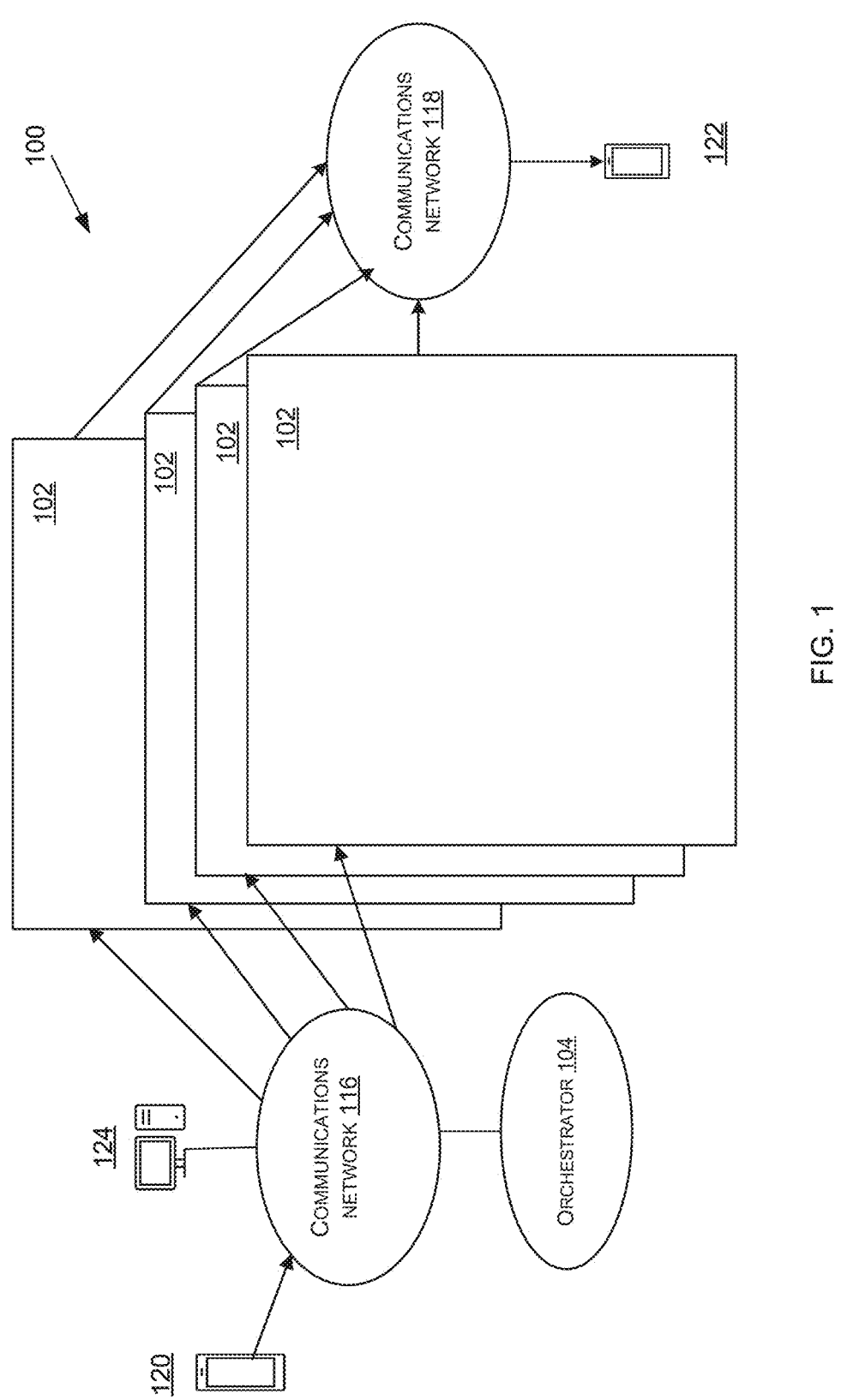
FIG. 1 is a schematic diagram of a plurality of network elements in a communications network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As mentioned above, network elements such as session border controllers, firewalls, routers, switches and other communications network nodes often need to be controlled by a communications network infrastructure provider or communications network operator. The communications network may be a telecommunications network in some cases and the network elements may be telephony network elements. Increasingly communications network element functionality is deployed using containers, where a container is software together with any libraries, dependencies and configuration files needed to execute the software. A container is portable between computing environments in that it is able to execute on different computing environments that it is ported between. A software container is independent of its computing environment. communications network element functionality is also deployed using virtual machines or other compute entities.

Where the communications network element is controlled using imperative software instructions it can be difficult to achieve control of the network in an efficient manner using an orchestrator since orchestrators use declarative configuration or desired state. A non-exhaustive list of examples of orchestrators is: Kubernetes (trade mark), Docker Swarm (trade mark), AWS CloudFormation (trade mark), Terraform (trade mark), Ansible (trade mark), Puppet (trade mark), Salt (trade mark). An orchestrator is software for controlling instantiation of containers, deleting containers, configuring containers. An orchestrator is able to send a desired configuration to a computing entity in order to trigger the computing entity to instantiate, delete or modify a container deployed at the computing entity. Orchestrators are not limited to containers; that is an orchestrator may be used to send desired configuration to a computing entity such as a virtual machine or other computing entity to instantiate, delete or modify an instance of a network element.

A declarative configuration is a specification of one or more network element instances where the specification is to be reached by one or more computing entities that receive the declarative configuration. To reach the specification the computing entities may have to instantiate a network element instance, modify a network element instance, delete a network element instance. In contrast, an imperative instruction is a specification of a particular action to be taken, such as to update a field in a specified way or set a value of a parameter. Using declarative configuration to control communications networks is beneficial since it is possible to roll back changes to previous versions if things go wrong. Disaster recovery is also facilitated since it is possible to use declarative configuration to build a new copy of a network from scratch if needed. Using declarative configuration to control network elements is scalable to situations where fleets of network elements are to be controlled. Declarative configuration may be issued to a plurality of network elements at the same time so as to achieve scalability. Because the instructions are issuable to a plurality of network elements at the same time it is possible to coordinate changes at the individual telephone network elements and avoid inconsistencies and conflicts. In contrast, where imperative instructions are used typically an engineer has to login manually to each network element and make changes manually, often using a command line interface (CLI). The manual process is time consuming, error prone and difficult to achieve without introducing inconsistencies and conflicts between network elements where changes have been effected and ones where changes are yet to be done. When using a CLI it is easy to make mistakes when applying changes individually to potentially hundreds of network elements. Because CLIs are imperative it is easy for configuration on each of the network elements to drift away from each other as changes are made, making maintaining a fleet of network elements harder still.

In various examples described herein, where network elements, such as telephony network elements in some cases, operate using imperative instructions, a mapping is used between declarative configuration and imperative instructions. Declarative configurations are translated or mapped into imperative instructions using rules, or look up tables. However, where a network is deployed using a highly available (HA) pair of network element instances it is not straightforward to achieve the mapping in an error free manner. Achieving efficiency of the mapping is another problem which is particularly acute in the case of telephony network elements implementing services where there are live ongoing calls; a difficulty is in reaching a desired state with minimal disruption to services provided by the communications network.

In various examples, where there is an HA pair of network element instance implementing a network element, such as a telephony network element or other element of a complex communications network, a desired configuration is sent to both the network element instances by an orchestrator. The network element instance acting as a "backup" drops the desired configuration in order that error free update of the configuration is achieved. Efficiency is gained by computing a difference between a record of a current configuration of an instance of the network element and the desired configuration without having to carry out a lengthy query of the network element instance itself to establish the current configuration of the network element instance. In various examples, by computing the mapping directly between the declarative configuration and a machine code of the network element, it is possible to achieve efficiency since a command line interface is unnecessary. The processes are scalable since the desired configuration may be sent to a plurality of networks.

FIG. 1 is a schematic diagram of a plurality of network elements 102 in a communications network 100 such as a wired or wireless communications network for transmitting packet-based communications such as voice over internet protocol calls. In some cases the communications network 100 is a telecoms communications network. The communications network is a 5G telecommunications network in some cases. The communications network 100 comprises a first communications network 116 and a second communications network 118 and in this example the network elements link the first communications network 116 to the second communications network 118 such as where the network elements are session border controllers SBCs. However, the network elements may be of other types, such as but not limited to, firewalls, routers, switches. The network elements may be located anywhere in the communications network 100 according to a particular function or use case of the network elements. Each network element is computer hardware executing a pair of highly available (HA) containers, virtual machines or other computing resource entities, implementing functionality of the network element.

One or more end user communication devices are shown including smart phones 120, 122 and desktop computer 124 to illustrate that calls may be established over the communications network 100 between end user communication devices. Other types of end user communication device may be used.

An orchestrator 104 is connected to the communications network 100. The orchestrator is computer implemented functionality for controlling instantiation of network element instances, deleting network element instances, configuring network element instances as explained above. The orchestrator may receive input from a network operator or infrastructure provider via one of the end user devices such as desktop computer 124 in order to specify how services are to be orchestrated. By using the orchestrator 104 it is possible to have the orchestrator send configuration files to the network elements 102. The configuration files specify desired configuration to be deployed in the communications network 100. A configuration file is written in a declarative form comprising a statement of a desired configuration (rather than a list of actions to take to reach the desired configuration). When a network element 102 which is designed to operate using imperative instructions receives a configuration file, the network element has to convert the declarative form of the configuration file into an imperative form in order to be able to attain the configuration specified in the configuration file.

One approach is to read a configuration of the network element (from the network element) each time a configuration file is received by the network element 102 from the orchestrator 104. A difference between the received configuration file and the read configuration may then be computed in order to be able to convert the difference into imperative form.

However, it is found that reading the configuration from the network element is time consuming and introduces latency which is not acceptable for many voice or video services. In some examples the latency is reduced by reducing a number of times that the configuration is read from the network element, such as by only doing a full read of the configuration of the telephone network element immediately after a failover event. A failover event is where the network element comprises an HA pair of containers, one being primary and one being backup, and where the backup container takes over in response to failure of the primary container. In some cases failure is detected by the backup network element instance and in some cases by an orchestrator.

In various examples there is a method performed by a network element comprising implementing a replication process between a first instance and a second instance of the network element. The second instance is able to take over functioning of the network element in the event of failure of the first instance. A desired configuration to be applied to the network element is received at both instances. However, the second instance is arranged to drop the desired configuration. The first instance maps the desired configuration from a declarative form to an imperative form. The imperative form of the desired configuration is executed at the first instance such that the desired configuration is applied at the network element. This gives an efficient and effective way to update configuration of the network element. The process is scalable to many network elements in a fleet. For example, the desired configuration may be received from an orchestrator in declarative form and the orchestrator may send the desired configuration to the whole fleet.

In some examples mapping the desired configuration from a declarative form to an imperative form comprises mapping directly from the declarative form to MIB instructions of the first instance or second instance. Since mapping does not go via an intervening command line interface efficiencies are gained.

In some cases mapping the desired configuration comprises computing a difference between a current configuration of the first instance and the desired configuration; and mapping the desired configuration comprises mapping only the computed difference from a declarative form to an imperative form. Mapping only the difference rather than the whole configuration gives efficiency.

In some examples, the first instance comprises a configuration injector and the second instance comprises a configuration injector, each configuration injector arranged to store a record of the instance configuration, compute the difference, map configuration from declarative to imperative form, and to send configuration in imperative form into a instance of the configuration injector. By enabling the configuration injector to store configuration it is possible for the configuration injector to compute the difference without having to read the configuration from the instance which gives efficiency gains and reduces latency. In examples, each of the configuration injectors is arranged to update its record of the instance configuration in response to sending configuration in imperative form into the instance. This improves accuracy of the record of the instance configuration and reduces the need to read the instance configuration from the instance itself.

Alternatively, or in addition, the functionality of a network element described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs). An example computing-based device for implementing a network element is described below with reference to FIG. 6.

Figure 2:
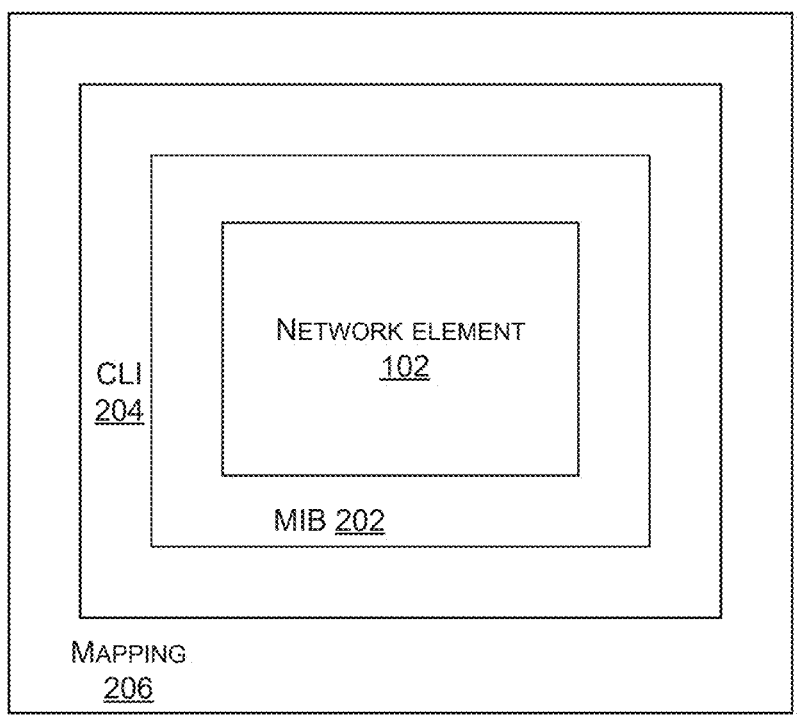
FIG. 2 is a schematic diagram of two network elements.
Figure 2:
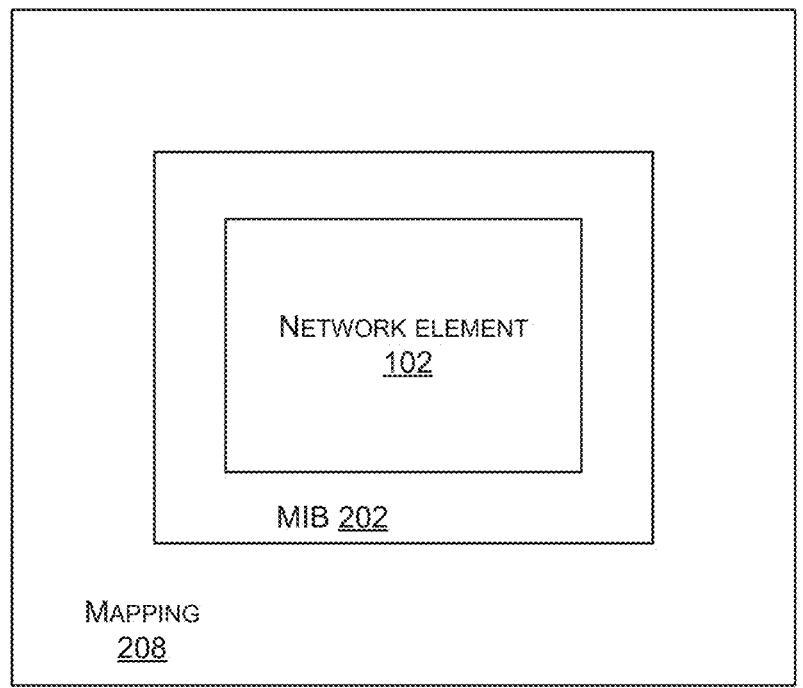

FIG. 2 is a schematic diagram of two network elements 102. In the upper part of FIG. 2 the network element 102 is implemented using software comprising management information base (MIB) 202 instructions and is wrapped with a command line interface 204 to enable human engineers to use the CLI 204 to send commands and receive responses from the network element 102. Note that it is not essential to use MIB as any low-level network element configuration may be used. A low-level network element configuration is a format or language for specifying configuration of a network element using features of containers, virtual machines or other compute entities which are used to deploy the network element. Since the features are of the underlying compute entities they are ones typically unfamiliar to network engineers who deploy and manage services on the network, such as telco operators. The network element 102 operates using imperative instructions since the MIB 202 comprises imperative code. The CLI 204 is also formed using imperative code. A mapping layer 206 around the CLI 204 is software that maps between declarative configuration file instructions and imperative CLI format software. In order to control the network element 102 in the example of the upper part of FIG. 2, a declarative configuration file is mapped by mapping layer 206 into imperative CLI instructions 204. The CLI instructions trigger instructions in the MIB code 202 which updates configuration of the network element 102. In an example the network element is a session border controller and the configuration is changed in order to change how the SBC treats packets travelling between the first and second communications networks of FIG. 1. In another example the network element is a firewall and the configuration is changed in order to change which packets the firewall blocks travelling between the first and second communications networks of FIG. 1.

The network element of the disclosure operates in an unconventional manner to achieve declarative configuration updates efficiently.

Dropping the desired configuration at the second container improves the functioning of the underlying HA container pair of the network element.

In the example in the lower part of FIG. 2 the network element 102 is the same as that of the upper part of FIG. 2 except that the CLI 204 is omitted and the mapping 208 is direct between declarative configuration files and MIB 202 instructions. By mapping directly between declarative configuration files and imperative MIB 202 instructions efficiencies are gained as compared with the arrangement of the upper part of FIG. 2.

The network elements of FIG. 2 may comprise HA pairs of containers, virtual machines or other compute elements although this is not shown in the drawing for clarity.

Figure 3:
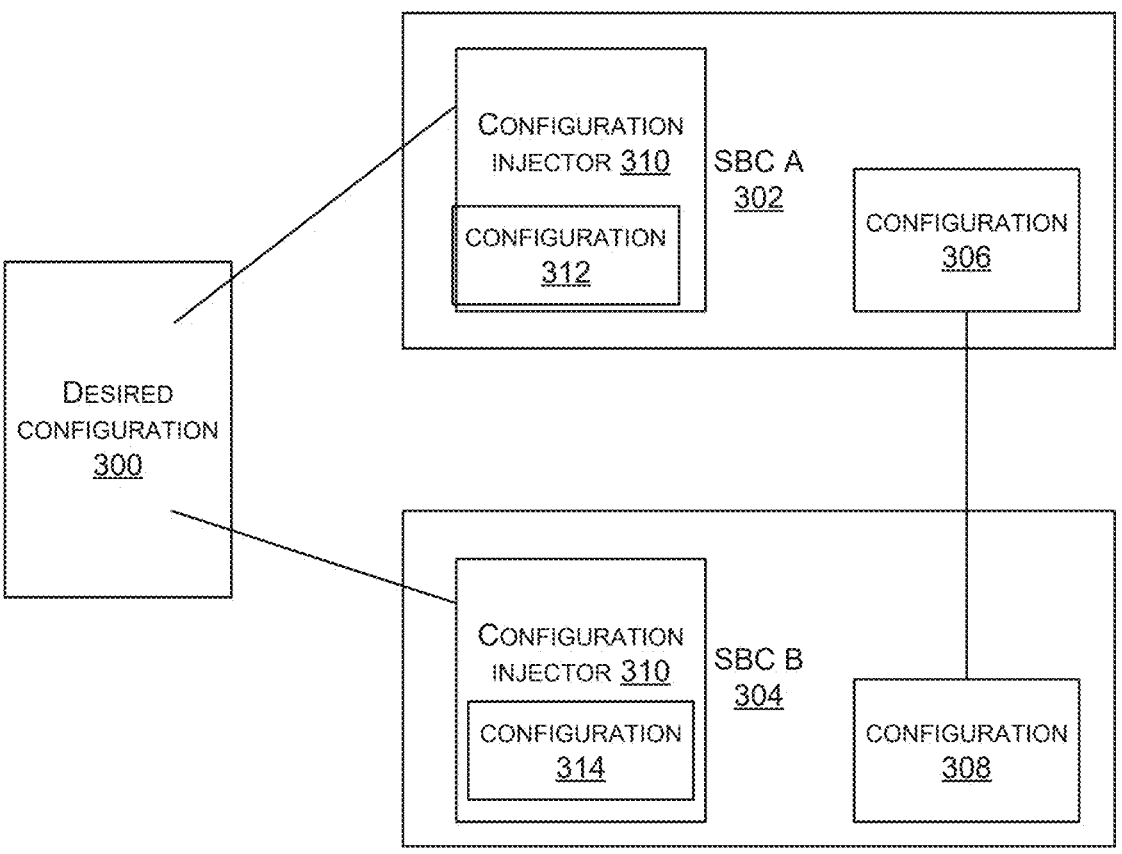
FIG. 3 is a schematic diagram of a highly available pair of instances of a network element implementing a network element which is a session border controller.

FIG. 3 is a schematic diagram of a highly available pair of network element instances 302, 304 implementing a network element 102 which is a session border controller. A session border controller is a network element deployed to protect session initiation protocol SIP based voice over Internet Protocol communications networks. In this example a primary one of the pair of instances is named SBC A 302 and a backup one of the pair of instances is named SBC B 304 although this is a non limiting example. An orchestrator (such as that of FIG. 1) has sent a configuration file with desired configuration 300 to each network element instance 302, 304 of the HA pair of instances. Each instance has a configuration injector 310 which is functionality to receive configuration files from an orchestrator, compute a difference between a received configuration file and the configuration injector's current view of the configuration of the container, and map the computed difference from declarative form to imperative form. The imperative form is a list of imperative instructions. The configuration injector 310 has functionality to send (inject) the imperative instructions from the list into the instance one by one, in the order of the instructions in the list. When an imperative instruction is sent into the instance it is executed by the instance and changes the configuration of the instance. Thus by injecting the imperative instructions into the instance the configuration of the instance is gradually updated to the desired configuration (i.e. the configuration of the configuration file most recently received by the configuration injector 310). The process of injecting the imperative instructions into the instance and executing those in the instance typically takes a few seconds. In the example of FIG. 3 the configuration of the SBC A container 302 is illustrated schematically at 306 and the configuration of the SBC B container 304 is illustrated schematically at 308.

When the configuration injector 310 computes the difference it uses its current view of the configuration of the network element instance. This current view is illustrated in FIG. 3 at 312 for SBC A and 314 for SBC B. A configuration injector updates its current view as it injects instructions into the instance. In this way a configuration injector 310 is able to keep an up to date view of the configuration of the instance without having to do a full read of the instance itself. Since a full read of the instance is time consuming, this is a significant efficiency.

Because the instance SBC A 302 and SBC B 304 are in an HA pair, there is a replication process which replicates configuration of the primary one of the instances (SBC A 302) to the backup one of the instances (SBC B 304) as indicated by an arrow in FIG. 3. Thus as the configuration injector 310 in SBC A 302 injects instructions into SBC A 302 one by one those instructions are executed in SBC A 302 and are also replicated into SBC B 304 one by one.

If a failure of SBC A 302 occurs during the process of the configuration injector 310 injecting instructions into SBC A 302 then a failover event occurs. SBC B may monitor SBC A and detect the failure. In some cases an orchestrator detects the failure. During the failover event SBC B becomes the primary instance and takes over functioning of the network node. Another instance has to be instantiated to become a back up instance to the new primary instance. The new back up instance is not illustrated in FIG. 3 for clarity.

When SBC B 304 becomes the primary instance, as a result of a failover event, the configuration injector 310 in SBC B 304 carries out a full read of the configuration 308 of SBC B 304. It is time consuming to do this full read but because failover events are rare the latency is acceptable. The full read of the configuration 308 is carried out because the configuration injector 310 does not have an accurate view 314 of the configuration 308. This is because since SBC B 304 was previously the backup container, it was not injecting configuration and so it was unable to update it's view 314 of the configuration 308 as the configuration 308 changed due to replication from SBC A 302.

At the beginning of the process (before the failover event) the desired configuration 300 is sent to both instances. The primary container SBC A 302 stores the desired configuration 300 in configuration injector 310 and uses it to compute the difference mentioned above. The backup container SBC B 304 drops the desired configuration 300 since it has no need of it and memory is saved by dropping it. By dropping the desired configuration the backup container avoids errors that may result from computing a difference between the desired configuration and the backup container's view 314 of its current configuration which may be incorrect.

FIG. 3 is also applicable to other types of network elements as well as to SBCs.

Figure 4:
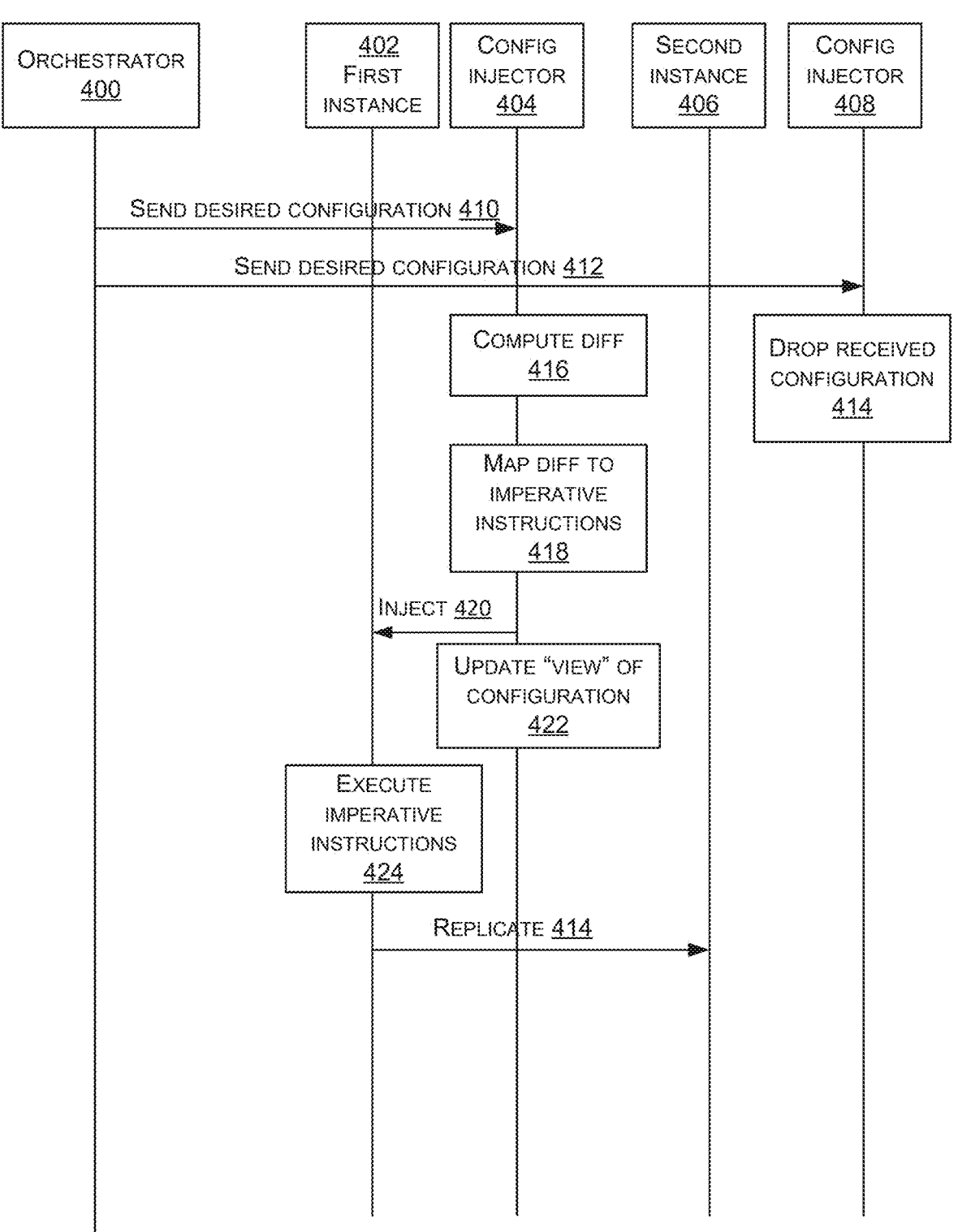
FIG. 4 is a flow diagram of a method performed in a communications network comprising an orchestrator and a network element.

FIG. 4 is a flow diagram of a method performed in a communications network (such as that of FIG. 1) comprising an orchestrator 400 and a network element. The network element comprises an HA pair of instances: first instance 402 which is primary instance and second instance 406 which is back up or secondary instance. The first instance comprises a configuration injector 404 and the second instance comprises a configuration injector 408.

The orchestrator 400 sends 410 a configuration file comprising a desired configuration to the configuration injector 404 of the first instance 402. The orchestrator 400 also send the configuration file comprising the desired configuration to the configuration injector 408 of the second instance 406. In the case of a fleet of network elements (such as in FIG. 1) the orchestrator may send the configuration file to all of the instances making up the fleet.

The configuration injector 408 in the second instance 406 drops 414 the received configuration. The term "drops" means that the second instance 406 discards or deletes the desired configuration it received as a result of message 412 from the orchestrator. By doing this memory is freed at the configuration injector 408 of the second instance. Risk of error due to the configuration received from message 412 becoming out of date (i.e. being an inaccurate view of the configuration of the second instance) is reduced since the desired configuration is dropped at operation 414.

The configuration injector 404 at the first instance computes 416 a difference between the configuration file received from message 410 and the configuration injector's view of the current configuration of the first instance. The configuration injector's view of the current configuration of the first instance is stored in the configuration injector. When the first instance is instantiated the configuration injector does a full read of the configuration of the first instance and stores the result of the full read as the current view of the configuration of the first instance. As the configuration injector of the first instance injects instructions into the first instance the configuration injector updates it's current view of the configuration accordingly. The update is done using rules.

Using the computed difference the configuration injector 404 maps 418 the difference to imperative instructions. The mapping is done using rules or look up tables. The result of the mapping is a list of imperative instructions. The configuration injector of the first instance injects 420 the imperative instructions one by one into the first instance in the order specified in the list. The first instance 402 receives the instructions and executes 424 them so as to update configuration of the first instance.

A replication process replicates 414 the updates to the configuration of the first instance to the second instance 406 since the first and second instances are an HA pair.

The process of FIG. 4 enables a network element that provides functionality using imperative instructions to have its configuration updated declaratively by an orchestrator. Thus the process of FIG. 4 is scalable since the declarative desired configuration may be sent by the orchestrator to a plurality of network elements in parallel.

The process of FIG. 4 is efficient since it is not necessary to make a read of the configuration of the network element instance each time a desired configuration is received. The process of FIG. 4 is efficient since the mapping may be direct between declarative configuration and imperative instructions of machine code of a network element. There is no need to map to an intermediate command line interface format.

The process of FIG. 4 is safe i.e. not prone to errors, since the second instance (the backup instance) drops the configuration file it receives from the orchestrator 400.

Figure 5:
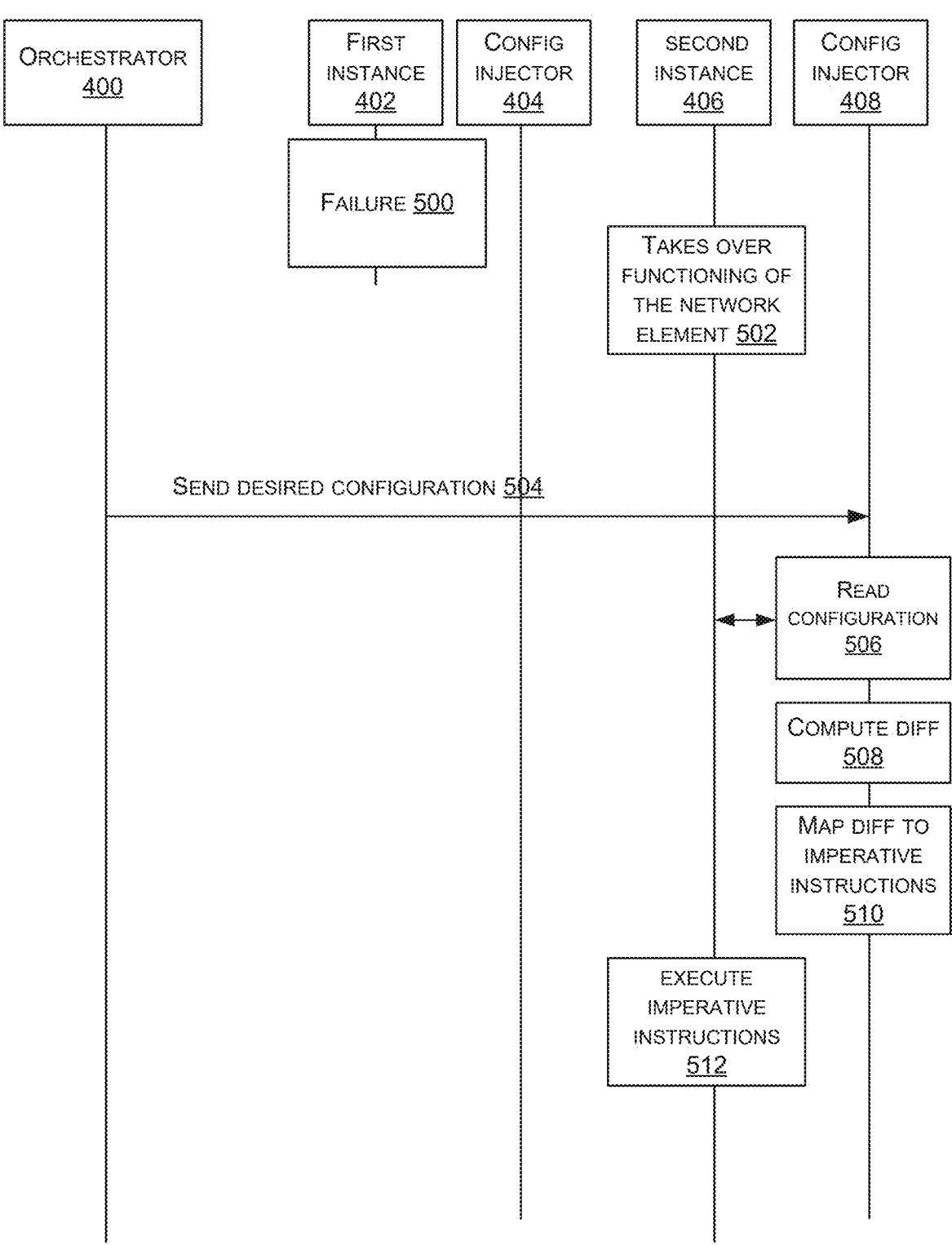
FIG. 5 is a flow diagram of another method performed in the communications network of FIG. 1.

FIG. 5 is a flow diagram of another method performed in the communications network of FIG. 1. The method of FIG. 5 may follow on from the method of FIG. 4 but that is not essential. FIG. 5 shows the same entities as in FIG. 4.

The first instance experiences a failure 500 such as a malfunction. Because the first and second instances 402, 406 are part of an HA pair, the second instance takes over 502 functioning of the network element. The second instance is able to take over the functioning since the configuration has been replicated from the first instance 402 as explained with reference to FIG. 4 and due to the first and second instances being part of an HA pair of instances.

The orchestrator 400 sends 504 a configuration file comprising a desired configuration to the first and second instances. Since the first instance 402 is not operational the first instance does not receive the configuration file. The configuration injector 408 of the second instance does receive the configuration file with the desired configuration.

The configuration injector 408 of the second instance, does not have a current view of the configuration of the second instance at this point. Because of the failover event. Therefore the configuration injector 408 of the second instance does a full read 506 of the second instance in order to establish what the configuration of the second instance is. The full read is time consuming. However it is only done after a failover event and since failover events are rare this is acceptable delay.

The configuration injector 408 of the second instance computes a difference 508 between the configuration file it received in message 504 and the result of the full read at operation 506. The configuration injector 408 maps 510 the computed difference from declarative form to imperative form. The result is a list of imperative instructions. The configuration injector injects the imperative instructions from the list one by one into the second instance 406 and the second instance executes 512 them one by one. As the configuration injector injects the imperative instructions it updates its view of the configuration that it obtained at operation 506. In this way the second instance is able to deal with subsequent configuration files it receives from the orchestrator 400 without doing a read of the instance configuration. Thus latency is reduced.

The process of FIG. 5 is efficient since a read of the configuration of the instance is done only once immediately after a failover event. The process of FIG. 5 is efficient since the mapping 510 may be direct between declarative configuration of a configuration file and imperative instructions of machine code of a network element. There is no need to map to an intermediate command line interface format.

The process of FIG. 5 is safe i.e. not prone to errors, since the second instance reads 506 the configuration immediately after a failover event so there is no inconsistency between its view of the configuration and what the configuration actually is.

Figure 6:
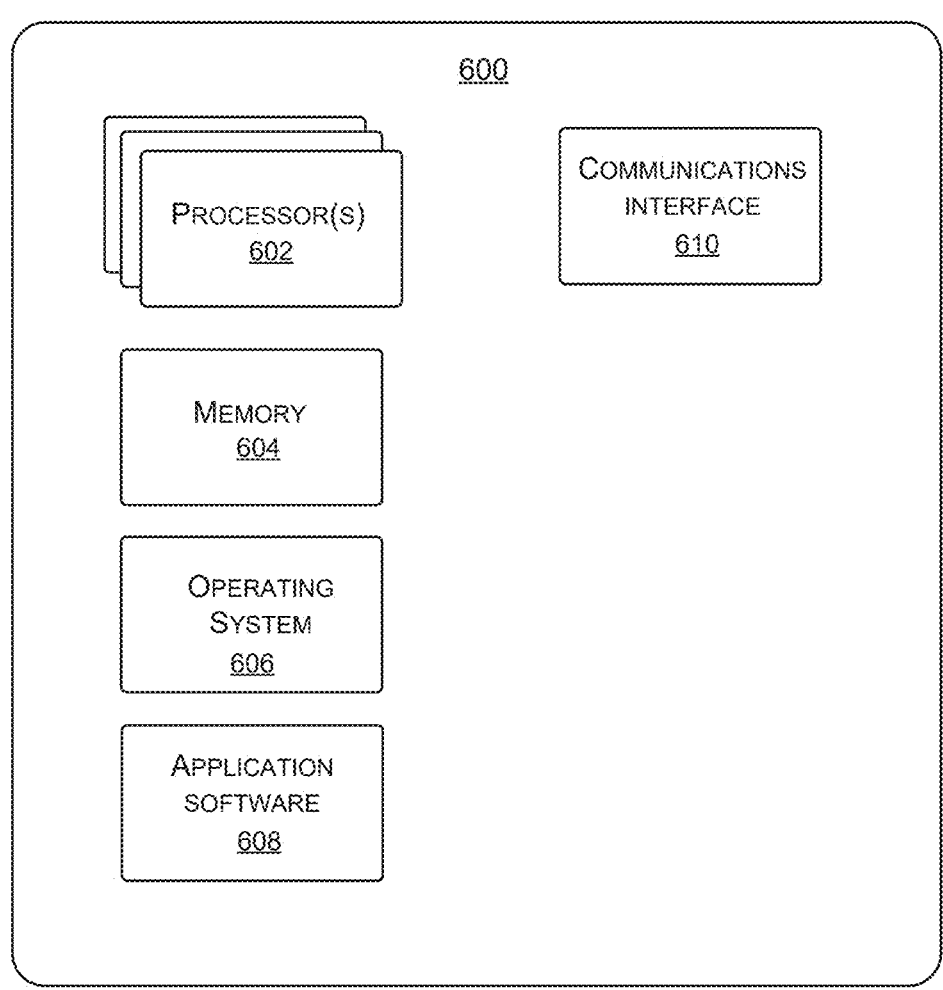
FIG. 6 illustrates an exemplary computing-based device for implementing a network element.

FIG. 6 illustrates an exemplary computing-based device for implementing a network element. The computing-based device is a node in a communications network for implementing a service such as voice over internet protocol calls.

Computing-based device 600 comprises one or more processors 602 which are microprocessors, controllers or any other suitable type of processors for processing computer executable instructions to control the operation of the device in order to update configuration of a container in memory 604 of the computing-based device 600. In some examples, for example where a system on a chip architecture is used, the processors 602 include one or more fixed function blocks (also referred to as accelerators) which implement a part of the method of any of FIGS. 3 to 5 in hardware (rather than software or firmware). A pair of HA instances deploying a network element function may be stored in memory 604 of the computing-based device. Optionally, platform software comprising an operating system 606 or any other suitable platform software is provided at the computing-based device to enable application software 608 to be executed on the device.

The computer executable instructions are provided using any computer-readable media that is accessible by computing based device 600. Computer-readable media includes, for example, computer storage media such as memory 604 and communications media. Computer storage media, such as memory 604, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 604) is shown within the computing-based device 600 it will be appreciated that the storage is, in some examples, distributed or located remotely and accessed via a network or other communication link (e.g. using communication interface 610). The computing-based device is able to be connected to other nodes of a communications network via communications interface 610.

Alternatively or in addition to the other examples described herein, examples include any combination of the following clauses:

Clause A. A method performed by a network element comprising:

implementing a replication process between a first instance and a second instance of the network element, such that the second instance is able to take over functioning of the network element in the event of failure of the first instance;

receiving, at the first instance of the network element, a desired configuration to be applied to the network element;

receiving, at the second instance of the network element, the desired configuration; dropping the desired configuration at the second instance;

mapping the desired configuration from a declarative form to an imperative form at the first instance and executing the imperative form of the desired configuration at the first instance such that the desired configuration is applied at the network element.

Clause B. The method of clause A wherein mapping the desired configuration from a declarative form to an imperative form comprises mapping directly from the declarative form to configuration suitable for applying to hardware elements directly.

Clause C. The method of any preceding clause wherein mapping the desired configuration from a declarative form to an imperative form comprises mapping from the declarative form to MIB instructions without an intervening command line interface form.

Clause D. The method of any preceding clause wherein the desired configuration is received from an orchestrator in declarative form.

Clause E. The method of any preceding clause wherein mapping the desired configuration comprises computing a difference between a current configuration of the first instance and the desired configuration; and wherein mapping the desired configuration comprises mapping only the computed difference from a declarative form to an imperative form.

Clause F. The method of any preceding clause wherein the first instance comprises a configuration injector and the second instance comprises a configuration injector, each configuration injector arranged to store a record of the instance configuration, compute the difference, map configuration from declarative to imperative form, and to send configuration in imperative form into a instance of the configuration injector.

Clause G. The method of clause F wherein each of the configuration injectors is arranged to update its record of the instance configuration in response to sending configuration in imperative form into the instance.

Clause H. The method of clause F or clause G wherein sending configuration in imperative form into a instance comprises accessing a list of instructions being the configuration in imperative form, and sending instructions from the list into the instance one by one.

Clause I. The method of any of clauses F to H comprising:

in response to detecting a failure of the first instance, instructing the second instance to take over functioning of the network element;

receiving a current desired configuration at the configuration injector of the second instance;

using the configuration injector of the second instance to read configuration stored in the second instance;

computing a difference between the current desired configuration and the read configuration;

mapping the difference from declarative to imperative form;

using the configuration injector of the second instance to send the imperative form of the difference into the second instance for execution in the second instance.

Clause J. The method of clause I comprising storing the configuration in the second instance.

Clause K. A network element comprising:

a processor;

a memory storing a first instance and a second instance, the first and second instances comprising instructions which when executed using the processor cause the network element to:

replicate from the first instance to the second instance such that the second instance is able to take over functioning of the network element in the event of failure of the first instance;

receive, at the first instance of the network element, a desired configuration to be applied to the network element;

receive, at the second instance of the network element, the desired configuration;

drop the desired configuration at the second instance;

map the desired configuration from a declarative form to an imperative form at the first instance and execute the imperative form of the desired configuration at the first instance such that the desired configuration is applied at the network element.

Clause L. The network element of clause K wherein mapping the desired configuration from a declarative form to an imperative form comprises mapping directly from the declarative form to MIB instructions.

Clause M. The network element of clause K or clause L wherein mapping the desired configuration from a declarative form to an imperative form comprises mapping from the declarative form to MIB instructions without an intervening command line interface form.

Clause N. The network element of any of clauses K to M wherein the desired configuration is received from an orchestrator in declarative form.

Clause O. The network element of any of clauses K to N wherein mapping the desired configuration comprises computing a difference between a current configuration of the first instance and the desired configuration; and wherein mapping the desired configuration comprises mapping only the computed difference from a declarative form to an imperative form.

Clause P. The network element of any of clauses K to O wherein the first instance comprises a configuration injector and the second instance comprises a configuration injector, each configuration injector arranged to store a record of the instance configuration, map configuration from declarative to imperative form, and to send configuration in imperative form into a instance of the configuration injector.

Clause Q. The network element of clause P wherein each of the instances is arranged to update its record of the instance configuration in response to sending configuration in imperative form into the instance.

Clause R. The network element of clause P or clause Q wherein sending configuration in imperative form into a instance comprises accessing a list of instructions being the configuration in imperative form, and sending instructions from the list into the instance one by one.

Clause S. The network element of any of clauses P to R comprising:

in response to detecting a failure of the first instance, instructing the second instance to take over functioning of the network element;

receiving a current desired configuration at the configuration injector of the second instance;

using the configuration injector of the second instance to read configuration stored in the second instance;

computing a difference between the current desired configuration and the read configuration;

mapping the difference from declarative to imperative form;

using the configuration injector of the second instance to send the imperative form of the difference into the second instance for execution in the second instance.

Clause T. A communications networks comprising a plurality of network elements, each network element comprising:

a processor;

a memory storing a first instance and a second instance, the first and second instances comprising instructions which when executed using the processor cause the network element to:

replicate from the first instance to the second instance such that the second instance is able to take over functioning of the network element in the event of failure of the first instance;

receive, at the first instance of the network element, a desired configuration to be applied to the network element;

receive, at the second instance of the network element, the desired configuration;

drop the desired configuration at the second instance;

map the desired configuration from a declarative form to an imperative form at the first instance and execute the imperative form of the desired configuration at the first instance such that the desired configuration is applied at the network element.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method performed by a network element, the method comprising:

implementing a replication process between a first instance and a second instance of the network element, such that the second instance is able to take over functioning of the network element in the event of failure of the first instance;

receiving, at the first instance of the network element, a desired configuration to be applied to the network element;

receiving, at the second instance of the network element, the desired configuration;

dropping the desired configuration at the second instance;

mapping the desired configuration from a declarative form to an imperative form at the first instance;

executing the imperative form of the desired configuration at the first instance such that the desired configuration is applied at the network element; and replicating the mapped configuration into the second instance of the network element using the replication process.

2. The method of claim 1, wherein mapping the desired configuration from a declarative form to an imperative form comprises mapping directly from the declarative form to a configuration suitable for applying to hardware elements directly.

3. The method of claim 1, wherein mapping the desired configuration from a declarative form to an imperative form comprises mapping from the declarative form to MIB instructions without an intervening command line interface form.

4. The method of claim 1, wherein the desired configuration is received from an orchestrator in declarative form.

5. The method of claim 1, wherein mapping the desired configuration comprises computing a difference between a current configuration of the first instance and the desired configuration; and wherein mapping the desired configuration comprises mapping only the computed difference from a declarative form to an imperative form.

6. The method of claim 1, wherein the first instance comprises a configuration injector and the second instance comprises a configuration injector, each configuration injector arranged to store a record of the instance configuration, compute the difference, map configuration from declarative to imperative form, and to send configuration in imperative form into a instance of the configuration injector.

7. The method of claim 6 wherein each of the configuration injectors is arranged to update its record of the instance configuration in response to sending configuration in imperative form into the instance.

8. The method of claim 6 wherein sending configuration in imperative form into an instance comprises accessing a list of instructions being the configuration in imperative form, and sending instructions from the list into the instance one by one.

9. The method of claim 6 comprising:

in response to detecting a failure of the first instance, instructing the second instance to take over functioning of the network element;

receiving a current desired configuration at the configuration injector of the second instance;

using the configuration injector of the second instance to read configuration stored in the second instance;

computing a difference between the current desired configuration and the read configuration;

mapping the difference from declarative to imperative form; and using the configuration injector of the second instance to send the imperative form of the difference into the second instance for execution in the second instance.

10. The method of claim 9 comprising storing the configuration in the second instance.

11. A network element comprising:

a processor;

a memory storing a first instance and a second instance, the first and second instances comprising instructions which when executed using the processor cause the network element to:

replicate from the first instance to the second instance such that the second instance is able to take over functioning of the network element in the event of failure of the first instance;

receive, at the first instance of the network element, a desired configuration to be applied to the network element;

receive, at the second instance of the network element, the desired configuration;

drop the desired configuration at the second instance;

map the desired configuration from a declarative form to an imperative form at the first instance;

execute the imperative form of the desired configuration at the first instance such that the desired configuration is applied at the network element; and replicate the mapped configuration into the second instance of the network element.

12. The network element of claim 11, wherein mapping the desired configuration from a declarative form to an imperative form comprises mapping directly from the declarative form to MIB instructions.

13. The network element of claim 11, wherein mapping the desired configuration from a declarative form to an imperative form comprises mapping from the declarative form to MIB instructions without an intervening command line interface form.

14. The network element of claim 11, wherein the desired configuration is received from an orchestrator in declarative form.

15. The network element of claim 11, wherein mapping the desired configuration comprises computing a difference between a current configuration of the first instance and the desired configuration; and wherein mapping the desired configuration comprises mapping only the computed difference from a declarative form to an imperative form.

16. The network element of claim 11, wherein the first instance comprises a configuration injector and the second instance comprises a configuration injector, each configuration injector arranged to store a record of the instance configuration, map configuration from declarative to imperative form, and to send configuration in imperative form into a instance of the configuration injector.

17. The network element of claim 16, wherein each of the instances is arranged to update its record of the instance configuration in response to sending configuration in imperative form into the instance.

18. The network element of claim 16, wherein sending configuration in imperative form into an instance comprises accessing a list of instructions being the configuration in imperative form, and sending instructions from the list into the instance one by one.

19. The network element of claim 16, further comprising:

in response to detecting a failure of the first instance, instructing the second instance to take over functioning of the network element;

receiving a current desired configuration at the configuration injector of the second instance;

using the configuration injector of the second instance to read configuration stored in the second instance;

computing a difference between the current desired configuration and the read configuration;

mapping the difference from declarative to imperative form; and using the configuration injector of the second instance to send the imperative form of the difference into the second instance for execution in the second instance.

20. A communications network comprising a plurality of network elements, each network element comprising:

a processor;

a memory storing a first instance and a second instance, the first and second instances comprising instructions which when executed using the processor cause the network element to:

replicate from the first instance to the second instance such that the second instance is able to take over functioning of the network element in the event of failure of the first instance;

receive, at the first instance of the network element, a desired configuration to be applied to the network element;

receive, at the second instance of the network element, the desired configuration;

drop the desired configuration at the second instance;

map the desired configuration from a declarative form to an imperative form at the first instance;

execute the imperative form of the desired configuration at the first instance such that the desired configuration is applied at the network element; and replicate the mapped configuration into the second instance of the network element.

\* \* \* \* \*